United States Patent [19]
Piëch

[11] Patent Number: 4,823,905
[45] Date of Patent: Apr. 25, 1989

[54] IMPACT ACTUATED SAFETY APPARATUS FOR A VEHICLE

[75] Inventor: Ferdinand Piëch, Ingolstadt, Fed. Rep. of Germany

[73] Assignee: Audi AG., Ingolstadt, Fed. Rep. of Germany

[21] Appl. No.: 17,819

[22] Filed: Feb. 24, 1987

[30] Foreign Application Priority Data

Feb. 21, 1986 [DE] Fed. Rep. of Germany ....... 3605599

[51] Int. Cl.$^4$ ............................................. B60R 22/46
[52] U.S. Cl. ..................................... 180/274; 280/806
[58] Field of Search ................. 180/274; 280/806, 801

[56] References Cited

U.S. PATENT DOCUMENTS 3,521,724 7/1970 Mayer ................................. 180/274
3,654,412 4/1972 Heruna et al. ...................... 180/274
4,508,287 4/1985 Nilsson ............................... 280/806

FOREIGN PATENT DOCUMENTS 2160411 12/1985 United Kingdom ................ 280/806

Primary Examiner—Ross Weaver
Attorney, Agent, or Firm—Karl Horman

[57] ABSTRACT

An apparatus for use in an automotive vehicle for activating a safety device in response to an impact force exceeding a predetermined level. The apparatus includes elongated structure mounted to the body of a vehicle with one end recessed from the periphery of the body and movable relative thereto in response to such an impact force. The elongated structure is operatively connected, as by a cable, with the safety device to activate the latter in response to movement.

11 Claims, 2 Drawing Sheets

IMPACT ACTUATED SAFETY APPARATUS FOR A VEHICLE

BACKGROUND OF THE INVENTION

1. Field of the Invention

The invention relates generally to an impact actuated safety apparatus for use in a vehicle, and more particularly to an impact actuated apparatus of the kind for use in automotive vehicles equipped with drive aggregates mounted adjacent their rear axles and provided with safety devices adapted to be spontaneously activated by such apparatus when the vehicle is subjected to an impact exceeding a predetermined force released, for instance, as a result of a collision.

2. The Prior Art

Apparatus for enhancing the safety of passengers within a vehicle and activated by the energy released when such vehicle is involved in a collision are well known. West German patent specification No. DE-OS 33 37 232, for instance, discloses an apparatus in which a cable connected at one end to a front mounted engine or transmission and trained around a deflector or direction reversing device activates a device for enhancing the safety of a passenger in case the vehicle is involved in a front-end collision. The safety device may be such that it pulls the steering wheel out of a zone of potential impact with the driver's head, or that it elevates a forward portion of a seat occupied by a passenger, or that it tightens a seat belt to prevent forward propulsion of a passenger's torso.

The apparatus functions on the principle that in a collision of predetermined force a front-mounted engine or transmission is moved relative to the chassis of the vehicle, in a generally rearward direction. This relative movement is transmitted to the safety feature by way of the cable, and the safety device is thus activated in the aforesaid manner. Such apparatus, while effective in preventing injuries to passengers, is limited in its functioning to vehicles equipped with front-mounted engine and/or transmissions.

Another type of safety apparatus is the subject of west German patent specification No. DE-OS 16 55 597 disclosing a cable attached to a longitudinally moveable shock absorber. If as a result of a frontal collision, the shock absorber is subjected to a load it moves rearwardly of the vehicle, together with its mounting structure. This movement, by way of a plurality of deflectors or direction changing elements, is transmitted to a console in which the steering column is mounted, and the steering wheel may thus be moved away from the driver of the vehicle. The apparatus is of relatively complicated structure and may not be useful in praxi; for it is actuated even by minor collision forces acting on the shock absorber. To reset this apparatus to its operative condition in any event requires extensive repair work.

OBJECTS AND SUMMARY OF THE INVENTION

It is therefore an object of the invention to provide an automotive impact actuated safety apparatus of simple construction.

It is also an object of the invention to provide a safety apparatus of the kind referred to which may be utilized in automotive vehicles having rear or center mounted engines and/or transmissions.

Another object of the invention resides in the provision of a safety apparatus actuated only by impact forces exceeding a predetermined magnitude.

It is a further object of the invention to provide an impact reactive safety apparatus for an automotive vehicle which may be actuated by impact forces acting in predetermined directions deviating from the direction of movement of the vehicle.

A related object of the invention resides in the provision of a safety apparatus for an automotive vehicle which may be actuated by an impact force effective in an angular direction relative to the direction of movement of the vehicle.

In the accomplishment of these and other objects the invention, in a preferred embodiment thereof, provides for a safety apparatus for use in an automotive vehicle comprising at least one rigid elongated member extending from a portion recessed from the forward end of the chassis of the vehicle toward a portion rearward thereof and mounted for movement in a direction substantially rearwardly of said chassis, and cable means connected to the elongated member for transmitting the rearward movement thereof to a safety device for the activation thereof.

In one embodiment of the invention the elongated member may comprise a hollow shaft for enclosing a drive shaft extending forwardly of the engine of said vehicle.

The engine may preferably be mounted adjacent the rear axle of the vehicle and said elongated member may extend forwardly beyond the front axle of the vehicle.

In a further embodiment the elongated member may comprise a forwardly extending V-shaped forked member or yoke. The forked member may either be an independent structure or, in a further advantageous embodiment, it may be joined to rigid hollow member extending forwardly of the engine or transmission.

In still another embodiment there may be provided a plurality of, and preferably two, forwardly extending elongated supports in substantially parallel relationship each carrying elongated members responsive to rearward motion of said supports and connected to cable means, said supports being provided with apertures facing each other for providing passageways for said cable means, said cable means being operatively connected to safety devices for the activation thereof in response to rearward movement of at least one of said supports.

In a preferred embodiment the elongated members may be cylindrical housings of shock absorbers connected to a bumper.

In case of a collision exceeding a predetermined force, relative movement occurs between an elongated member mounted in a forward section of a vehicle and the chassis of the vehicle. This relative movement may be transmitted to a safety device by means of a cable for activating said safety device. Such an arrangement comprises a simple but extremely reliable and spontaneously responsive actuating means for safety equipment in any kind of automotive vehicle regardless of the position of its engine or transmission, and it is of especial advantage for use in vehicles having rear or center mounted engines.

By dimensioning the elongated member or support to terminate short of the forward end of an automotive chassis, a simple way of assuring that the apparatus becomes effective only in cases of collisions exceeding a predetermined force is being proposed. Such a construction in no way impairs the safety or effectiveness of the apparatus as the distance between the forward end of the elongated member and the front of the vehicle may be adjusted to suit particular needs. It thus becomes possible to arrange the apparatus in a manner that assures its actuation only in cases in which it is really necessary. For instance, the apparatus of the invention may be calibrated to suit particular requirements by adjusting the longitudinal position of forward supports relative to the rigid elongated member or members.

The elongated member may be of relatively light construction in cases where its rearward motion does not require a large force; it is essential, however, that it be sufficiently rigid to defy bending or warping in case of a collision. Where the elongated member is connected to other support structure of the vehicle it may have to be of a sufficient strength lest it be bent before it can move towards the rear.

The embodiment of the invention incorporating elongated members in front-end longitudinal supports of a vehicle is of particular advantage in that it does not require additional space; rather, space normally not used for anything else is being utilized. Such an arrangement would also assure that in case of an off-center collision, i.e. a collision lateral of the longitudinal axis of the vehicle, the ensuing deformation of the vehicle is taken up and transferred by the cable. In this connection it is to be noted that even a small deformation would suffice to actuate the safety apparatus; since the forces drawn upon are rather substantial devices providing for appropriate transmission ratios could easily be installed.

In vehicles equipped with shock absorbing supports for their bumpers the housings of the shock absorbing supports may advantageously be utilized as the rearwardly moveable elongated members. Thus, separate structural elements would become unnecessary and existing structure may be utilized for an additional beneficial purpose. This, in turn, would prevent increases in both costs and weight of the vehicle.

For the transmission of the relative motion between the elongated members and the longitudinal supports to the safety apparatus the longitudinal supports may be provided with openings adjacent end portions of the elongaged members for providing passage ways for cables affixed to the elongated members. Such openings preferably face each other, and the cables are advantageously joined to a common cable extending along the center line of the vehicle. In order to assure forward motion of the cable regardless of the direction of the (front-end) collision the cable may advantageously be trained through a sleeve provided with flared end sections. Such a sleeve need not necessarily be straight; it may be formed to suit structural requirements provided that it does not impede the movability of the cable. In fact, the cable and the sleeve may form a so-called Bowden wire. At its rear end the sleeve should preferably be flared open to reduce friction with the cable in case of a collision. The cable may be guide from the rear end of the sleeve to the safety device such as, for instance, a console of a steering column for moving the latter out of the way of the driver of the vehicle. Where it is intended that several safety devices be activated simultaneously or in a predetermined sequence, a corresponding number of connecting cables may be provided leading from the flared rear end of the sleeve to the respective apparatus.

In case of a frontal collision the elongated members may be moved rearwardly while the longitudinal supports are deformed in their forward sections. Accordingly, cables affixed to the elongated members and trained through the openings in the longitudinal supports are pulled in the desired manner.

The elongated members which, as stated above, may comprise the housings of shock absorbing bumper supports may be mounted to the longitudinal supports in their forward sections; but any other mounting suiting particular needs may also be used.

DESCRIPTION OF THE DRAWINGS

The novel features which are considered characteristic of the invention are set forth with particularity in the appended claims. The invention itself, however, in respect of its organization as well as its method of operation, together with other objects and advantages thereof will be best understood from the following description of the illustrative embodiments when read in conjunction with the accompanying drawings, in which:

DETAILED DESCRIPTION OF THE VARIOUS EMBODIMENTS

Figure 1:
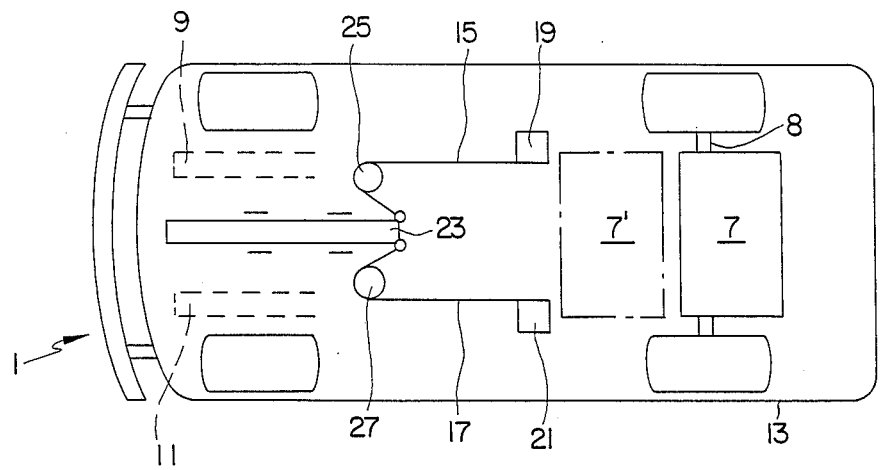
FIG. 1 is a schematic presentation in planar elevation of a vehicle including a rear-mounted engine and a front-mounted longitudinal member in accordance with the invention.

FIG. 1 depicts in planar elevation an automobile equipped with a drive aggregate, i.e. an engine and a transmission, mounted at the rear of the automobile 1, behind its rear axle 8, as schematically shown at 7. Instead of the rear-mounted aggregate 7, the vehicle 1 may be equipped with an engine and transmission centrally mounted forwardly of the rear axle 8, as schematically depicted at 7'. Such alternate structure would in no way interfere with the functionality of the apparatus of the present invention. In the forward section of the automobile there are provided two longitudinal supports 9 and 11 of a unitized body 13 of the automobile 1.

In the forward section of the automobile there is provided an arrangement which in case of a front-end collision causes seatbelts (not shown) to be tightened by activating appropriate tightening or coiling apparatus. This is accomplished by flexible and substantially inextensible means, such as cables, belts or ropes 15 and 17 connected to coiling apparatus 19 and 21 of such seatbelts.

In the embodiment shown, the cables 15 and 17 are attached to the rear end of an elongated member 23 mounted in a forward section of the automobile 1, and they are trained around deflecting or redirecting means, such as pulleys 25 and 27 to extend to the coiling apparatus 19 and 21.

In a frontal collision exceeding a predetermined force the forward portions of the longitudinal supports 9 and 11 are deformed. However, the elongated member 23 is sufficiently rigid or stiff and may therefore be pushed rearwardly of the automobil. In moving rearwardly the elongated member 23 may pull the cables 15 and 17 forwardly around the pulleys 25 and 27 to tighten the seatbelts by way of their coiling apparatus 19 and 21.

It will, of course, be appreciated by those skilled in the art that in the interest of clarity only those parts of the inventive structure are shown which are deemed to be necessary to explain the invention and its principle of operation. Restriction to the elements shown is not, however, intended to restrict the scope of protection sought.

The embodiments described hereinafter will be substantially based on automobile structures not unlike that of FIG. 1. For this reason the same reference characters, appropriately subscribed, are being used in connection with the description of those embodiments.

Figure 2:
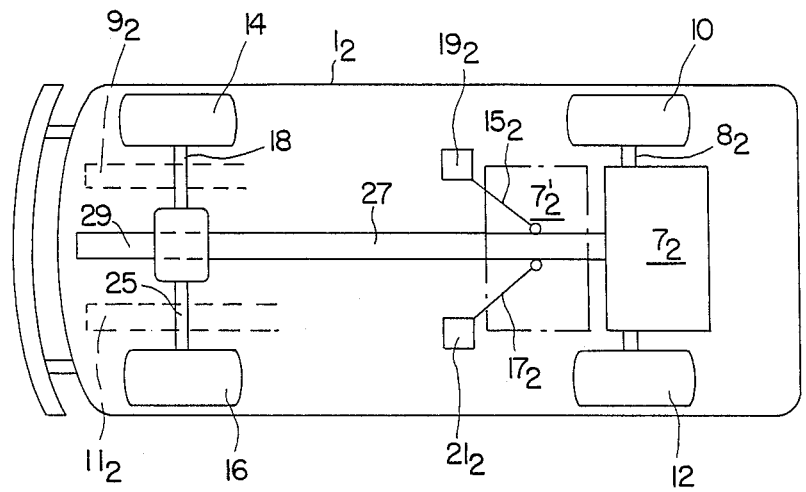
FIG. 2 is a schematic presentation of a vehicle, in planar elevation, including a rear-mounted engine and a central pipe enclosing a drive shaft connecting the engine to the front axle, with the pipe extending beyond the front axle.
Figure 3:
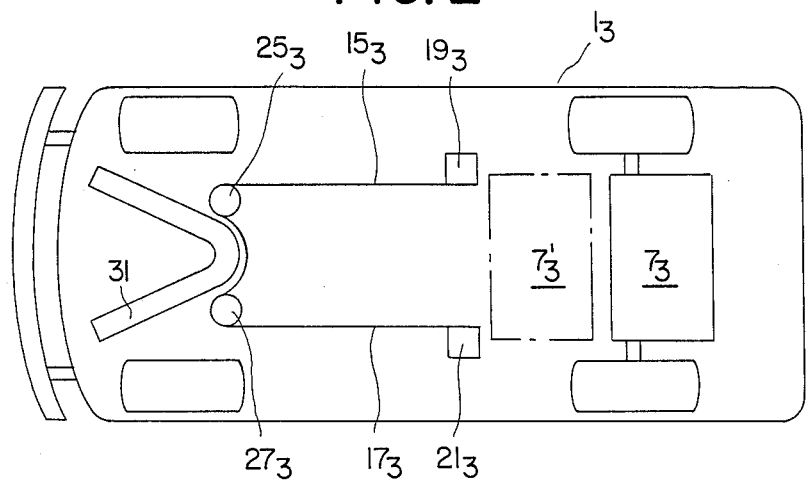
FIG. 3 is a view similar to that of FIG. 2 of an embodiment of the invention in which the elongated member is of substantially V-shaped configuration.

FIG. 2 depicts an arrangement in which the rear mounted engine $7_2$ does not only drive rear wheels 10 and 12 but also front whels 14 and 16. Again, the rear-mounted engine $7_2$ may be replaced by a center mounted engine $7'_2$ For this purpose the engine $7_2$ is connected to the front axle 25 by way of a drive shaft (not shown) enclosed by a pipe 27. As may be seen from FIG. 2, a forward section 29 of the pipe 27 extends forwardly beyond the front axle 18. The forward section 29 is constructed to be more rigid than the forward supports $9_2$ and $11_2$. Thus in a front-end collision only the latter will deform whereas the pipe 27 and its forward section 29 will be moved towards the rear of the automobile $1_2$. The movement of the pipe 27 will be transmitted to cables $15_2$ and $17_2$ affixed to the pipe 2, and, in turn, seat belts (not shown) will be tightened by way of coiling devices $19_2$ and $21_2$ to which the other ends of the cables $15_2$ and $17_2$ are connected. FIG. 3 shows a further advantageous embodiment of the invention in which an automobile $1_3$ is equipped, in its forward section, with an elongated member 31 of substantially forked or V-shaped configuration flaring towards the front end of the automobile $1_3$. The open end of the V-shaped elongated member is directed towards the front end of the automobile $1_3$ and is recessed therefrom. A loop 33 of a cable is trained around the closed end of the V-shaped member 31. Thus in a frontal collision exceeding a predetermined force the front end of the automobile $1_3$ will collapse and the V-shaped member 31 will be pushed rearwardly into the loop 33 of the cable. Sections $15_3$ and $17_3$ of the cable trained around pulleys $25_3$ and $27_3$ will thus be pulled forwardly and activate seatbelt coiling apparatus $19_3$ and $21_3$ to tighten seatbelts (not shown). One of the advantages to be derived from such an arrangement is that it may be actiuted even by an oblique collision, i.e. a collision occurring at an acute angle relative to the longitudinal axis of the automobile $1_3$.

Figure 4:
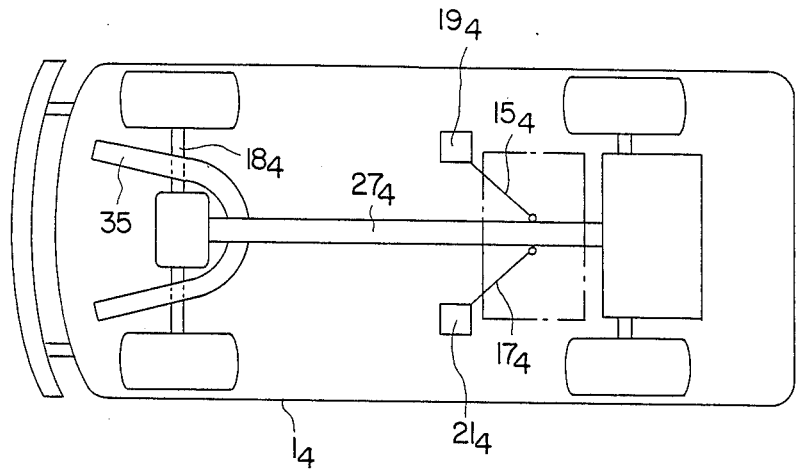
FIG. 4 is a view similar to that of FIG. 3 in which a V-shaped elongated member is connected to a central pipe.

FIG. 4 depicts an embodiment of the invention which also comprises a substantially V-shaped elongate member 35. In this embodiment the elongate member 35 is seen to be integral with the central pipe $27_4$ enclosing a drive shaft (not shown). The two arms of the elongate member extend forwardly of the front axle $18_4$ but terminate behind the front end of the automobile $1_4$. As in the previously described embodiments the distance between the front end of the automobile $1_4$ and the forward end of the elongate member 35 together with the crush properties of the automobile body in this section, determine the force of the collision required to affect movement of the elongate member 35 towards the rear of the automobile $1_4$. In such a collision, not only the elongate member 35 but the pipe $27_4$ as well are moved towards the rear of the automobile $1_4$. Cables $15_4$ and $17_4$ affixed to the pipe $27_4$ transfer this movement to seatbelt coiling apparatus $19_4$ and $21_4$ directly, i.e. without a redirecting device, and thus cause the seatbelts (not shown) to be tightened.

Figure 5A:
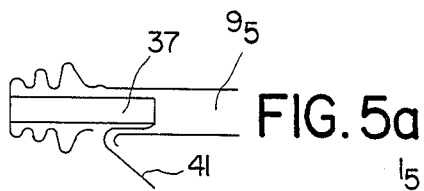
FIG. 5a is a planar view of a longitudinal support of the kind shown in FIG. 5b after a collision.
Figure 5B:
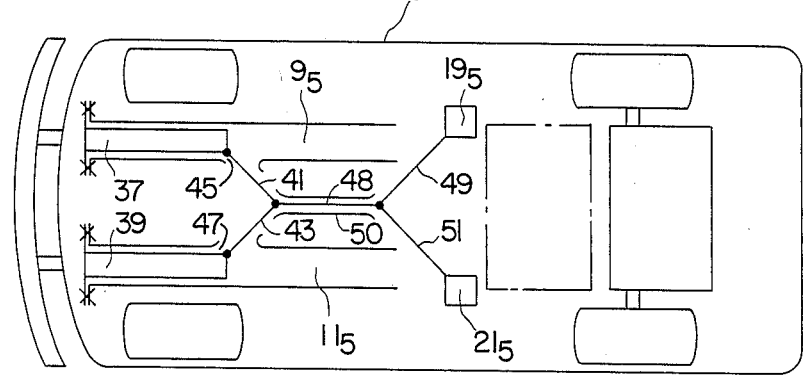
FIG. 5b is a view similar to that of FIG. 4 of an embodiment including two longitudinal supports having elongated members mounted therein.

Two elongate members 37 and 39 are utilized in the embodiment in accordance with FIG. 5. As shown the elongate members 37 and 39 are positioned in parallel relative to each other and are frictionally held in longitudinal frame supports $9_5$ and $11_5$ relative to which they may slide when engaged by impact force exceeding a predetermined level. They are connected to the latter at forward sections thereof. Such an arrangement is advantageous in that no additional space is required for mounting or housing the elongate members 37 and 39 and in that the apparatus is effective even in an off-center collision.

In a collision exceeding a predetermined force the front end of the automobile $1_5$ as well as the forward portion of the frame supports $9_5$ and $11_5$ may be deformed (see FIG. 5a). In view of the fact that the elongate members 37 and 39 are connected to the longitudinal supports $9_5$ and $11_5$ at their forward ends only, the elongate members are pushed rearwardly. In order to utilize this rearward movement for the actuation of a safety apparatus, such as a seat belt coiling device, a steering column retractor, or the like, sections 41 and 43 of cables are connected to the ends of both elongate members 37 and 39. The cables 41 and 43 are guided out of openings 45 and 47 in the frame supports $9_5$ and $11_5$. The openings 45 and 47 face each other and the center line of the automobile $1_5$. The cables 41 and 43 are joined together, adjacent the center line of the automobile $1_5$ and extend rearwardly of the automobile as a common cable 48. The cable 48 is guided through a sleeve or tunnel 50. The tunnel 50 is seen to be flaring open at both of its ends so that the position of the cable 48 may be varied and sufficient movement of the cable 48 is assured regardless of which side of the automobile $1_5$ is impacted by a front-end collision. At the rear opening of the tunnel 50 the cable 48 is again divided into, or connected to, two cable sections 49 and 51 extending to safety apparatus, such as seatbelt coiling devices $19_5$ and $21_5$. Of course, if only one safety device is to be activated by the apparatus it would not be necessary to splice the cable 48 into, or provide more than, two sections. On the other hand, if more than two safety devices are to be activated simultaneously or in a predetermined sequence, it could easily be accomplished by splicing the cable 48 at the rear opening of the tunnel 50, into, or providing, the appropriate number of cable sections.

Figure 6:
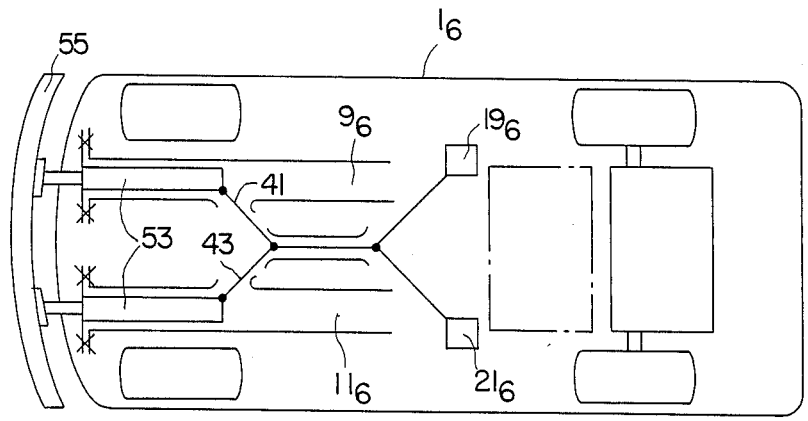
FIG. 6 is a view similar to that of FIG. 5b of an embodiment in which the elongated members mounted in the longitudinal supports comprise housings of shock absorbing bumper supports.

FIG. 6 shows yet another embodiment of the invention which differs from that of FIG. 5 in that the elongate members are shown to comprise housings 53 of shock absorbers for a bumper 55. The shock absorber housings 53 are mounted to longitudinal frame supports.

In this arrangement structural elements conventionally present in automobiles are utilized to assume additional functions; thus no, or substantially no, increase in cost and weight of the apparatus is incurred. For the sake of clarity and brevity and since the shock absorbers are entirely conventional they are not described in any detail. They are of the kind which absorb impact forces up to a predetermined level acting against the bumper 55 to prevent the body of the automobile $1_6$ from being damaged. At higher speeds and commensurately greater impact forces, however, the forward section along with the longitudinal support is deformed causing the housings 53 to be pushed towards the rear of the vehicle. This rearward movement is taken up by cable sections $41_6$ and $43_6$ which are affixed to rear sections of the shock absorber housing 53 and are transferred by them to safety apparatus such as coiling devices $19_6$ and $21_6$ for seatbelts (not shown) in a manner similar to that described herein above.

It will be appreciated by those skilled in the art that the connections between the impact force actuated apparatus of this invention and the safety devices activated thereby is as conventional as are the safety devices themselves. These, as has been stated above, may be seatbelts tightened around passengers in a vehicle to prevent their forward propulsion in collision induced abrupt decelerations, or they may be of the kind which retract a steering wheel into a dashboard to prevent the head of the passenger from impacting with it, or they may cause passenger seats to be tilted backwardly. Such devices may be activated singly or in combination, either simultaneously or in a predetermined sequence. Since such safety devices are entirely conventional they have not been described in any detail, nor have they been depicted in the drawings but for a schematic presentation of their activating mechanisms; for the person skilled in the art will be familiar with such devices to provide the appropriate interface between apparatus of the present invention and devices to be activated by them.

While the invention disclosed may be utilized in any vehicle, it is of particular usefulness in automobiles equipped with rear-mounted or center mounted engines connected either to the rear axles or to the front axles or to both. By providing for a spacing between the member actuating the apparatus and those portions of an automobile first hit in a front-end collision the invention, in a simple and effective way provides for an apparatus for activating one or more safety devices only when impacted by a collision of a force in access of a predetermined level.

What is claimed is:

1. An apparatus for activating a safety device for the protection of a passenger in a vehicle comprising body means defining a predetermined periphery and a front axle, a rear axle and drive means mounted adjacent said rear axle, comprising:

means mounted to said vehicle for movement relative thereto in response to an impact exceeding a predetermined force and comprising at least one elongated member having at least one end section positioned inwardly of said periphery and substantially facing said impact, said elongated member comprising a drive shaft connecting said drive means with said front axle and including a section extending forwardly of said front axle and inwardly of said periphery;

means for substantially preventing physical distortion of said mounted means in response to said impact thereby to assure its movability; and means operatively connected to said mounted means for activating said safety device in response to said movement.

2. The apparatus of claim 1, wherein said vehicle comprises a front axle, a rear axle and drive means mounted adjacent said rear axle and wherein said elongated member comprises a hollow pipe member for housing a drive shaft connecting said drive means to said front axle and having an end section extending forwardly of said front axle and inwardly of said periphery.

3. The apparatus of claim 2, wherein said means for activating said safety device is flexible and substantially inextensible and is connected to said hollow pipe member adjacent said drive means.

4. The apparatus of claim 3, wherein said inextensible means is a cable.

5. The apparatus of claim 2, wherein said end section of said hollow pipe member comprises a substantially V-shaped member having two arm members extending forwardly of said front axle and inwardly of said periphery.

6. An apparatus for activating a safety device for the protection of a passenger in a vehicle comprising body means defining a predetermined periphery, comprising:

means mounted on said vehicle for movement relative thereto in response to an impact exceeding a predetermined force and comprising a substantially V-shaped member having two arms positioned inwardly of said periphery at least one of which faces in the direction of said impact; and means operatively connected to said mounted means for activating said safety device in response to said movement.

7. The apparatus of claim 6, wherein said two arms are joined together and wherein said means for activating said safety device is connected to said arms adjacent the junction thereof.

8. The apparatus of claim 7, wherein said means for activating said safety device is flexible and substantially inextensible.

9. The apparatus of claim 8, wherein said flexible means comprises a cable trained around said junction of said arms.

10. An apparatus for activating a safety device for the protection of a passenger in a vehicle comprising body means defining a predetermined periphery, comprising:

means mounted on said vehicle for movement relative thereto in response to an impact exceeding a predetermined force and comprising two elongate members positioned parallel to each other inwardly of said periphery and mounted for slidable movement in elongate frame support members and having first sections protruding from said frame support members in facing relationship with said impact and second end sections operatively connected to said safety device for the actuation thereof, each of said frame support members comprising means for forming an opening, said second end sections being connected to said safety device by cable means leading through each of said openings, said cable means being harnessed in a common cable extending through tunnel means having flared open ends for the reduction of friction with said cable means.

11. The apparatus of claim 10, wherein said two elongated members comprise cylindrical housings of shock absorbing means for supporting a bumper of said vehicle.

* * * * *